(12) United States Patent
Watanabe et al.

(10) Patent No.: US 8,229,284 B2
(45) Date of Patent: Jul. 24, 2012

(54) VIDEO SIGNAL TRANSMITTING APPARATUS AND VIDEO SIGNAL RECEIVING APPARATUS

(75) Inventors: Toshimitsu Watanabe, Yokosuka (JP);
Hitoaki Owashi, Yokohama (JP);
Kazuhiko Yoshizawa, Yokohama (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 13/005,909

(22) Filed: Jan. 13, 2011

(65) Prior Publication Data

US 2011/0109793 A1      May 12, 2011

Related U.S. Application Data

(60) Continuation of application No. 11/819,199, filed on Jun. 26, 2007, now Pat. No. 8,064,748, which is a division of application No. 10/105,788, filed on Mar. 26, 2002, now Pat. No. 7,386,216.

(30) Foreign Application Priority Data

Mar. 29, 2001  (JP) ................................. 2001-094528

(51) Int. Cl.
| | |
|---|---|
| H04N 9/70 | (2006.01) |
| H04N 9/79 | (2006.01) |
| H04N 5/92 | (2006.01) |
| H04N 7/01 | (2006.01) |
| H04N 11/20 | (2006.01) |
| H04N 11/02 | (2006.01) |
| H04N 11/04 | (2006.01) |
| H04N 7/12 | (2006.01) |
| H04N 17/02 | (2006.01) |
| H04N 17/04 | (2006.01) |
| H04N 9/10 | (2006.01) |
| H04N 9/14 | (2006.01) |

(52) U.S. Cl. ........ 386/300; 386/302; 386/326; 348/441; 348/445; 348/450; 348/180; 348/182; 348/196; 348/425.3; 348/426.1

(58) Field of Classification Search .................. 348/441, 348/445, 450, 180, 182, 196, 425.3, 426.1; 386/300, 302, 326
See application file for complete search history.

(56) References Cited

U.S. PATENT DOCUMENTS 4,870,490 A    9/1989 Sekiya et al.
(Continued)

FOREIGN PATENT DOCUMENTS

JP    6-233127    8/1994
(Continued)

OTHER PUBLICATIONS

Translation of JP 11275602, EZAKI, Oct. 1999.*
(Continued)

*Primary Examiner* — Daquan Zhao
(74) *Attorney, Agent, or Firm* — McDermott Will & Emery LLP

(57) ABSTRACT

An interface is realized that can prevent video signals from being copied easily and which uses a luminance/color difference signal transmission scheme with an excellent harmony with a television circuit. In a video transmission using a digital interface, colorimetry information for defining the conversion from the luminance/color difference signal into a primary color signal and video aspect ratio information are transmitted along with the luminance/color difference type video signal. This allows reproduction of video with high quality and high resolution and also realizes a copyright protection which allows only the users authorized by key information to use the content of the video. With this transmission scheme, it is possible to provide a transmitting apparatus, a receiving apparatus and an interface which highly harmonize with a rationalized television-based circuit.

3 Claims, 4 Drawing Sheets

U.S. PATENT DOCUMENTS

| | | | |
|---|---|---|---|
| 5,349,452 | A | 9/1994 | Maeda et al. |
| 5,844,629 | A | 12/1998 | Murray et al. |
| 6,057,889 | A * | 5/2000 | Reitmeier et al. ............ 348/555 |
| 6,118,486 | A | 9/2000 | Reitmeier |
| 6,226,011 | B1 | 5/2001 | Sakuyama et al. |
| 6,276,604 | B1 | 8/2001 | Proidl |
| 6,515,710 | B1 * | 2/2003 | Koshimuta ................... 348/557 |
| 6,621,526 | B1 | 9/2003 | Yamagishi |
| 7,231,042 | B2 | 6/2007 | Kori et al. |
| 2001/0012396 | A1 | 8/2001 | Kumada |
| 2001/0037307 | A1 | 11/2001 | Kori et al. |
| 2002/0162102 | A1 | 10/2002 | Ihara |

FOREIGN PATENT DOCUMENTS

| | | | |
|---|---|---|---|
| JP | 09-289645 | | 11/1997 |
| JP | 10-155094 | | 6/1998 |
| JP | 10-276295 | | 10/1998 |
| JP | 10-322723 | | 12/1998 |
| JP | 11-275602 | | 10/1999 |
| JP | 11275602 | A * | 10/1999 |
| JP | 2000-261821 | | 9/2000 |
| WO | WO 00/30363 | | 5/2000 |

OTHER PUBLICATIONS

Japanese Office Action, w/ partial English translation thereof, issued in Japanese Patent Application No. JP 2010-232087 dated Apr. 19, 2011.

Entire Prosecution of U.S. Appl. No. 11/819,199 to Watanabe, et al., filed Jun. 26, 2007, entitled "Video Signal Transmitting Apparatus and Video Signal Receiving Apparatus".

Entire Prosecution of U.S. Appl. No. 10/105,788 to Watanabe, et al., filed Mar. 26, 2002, entitled "Video Signal Transmitting Apparatus and Video Signal Receiving Apparatus".

Japanese Office Action issued in Japanese Patent Application No. JP 2001-094528 dated Jun. 9, 2009.

Japanese Office Action, w/ partial English translation thereof, issued in Japanese Patent Application No. JP 2009-230161 dated Feb. 16, 2010.

Notice of Allowance issued in U.S. Appl. No. 11/819,199, dated Sep. 15, 2011.

* cited by examiner

VIDEO SIGNAL TRANSMITTING APPARATUS AND VIDEO SIGNAL RECEIVING APPARATUS

RELATED APPLICATIONS

This application is a Continuation of U.S. patent application Ser. No. 11/819,199, filed on Jun. 26, 2007 now U.S. Pat. No. 8,064,748, which is a Divisional of U.S. patent application Ser. No. 10/105,788, filed on Mar. 26, 2002, now U.S. Pat. No. 7,386,216, claiming priority from Japanese Patent Application No. 2001-094528, filed on Mar. 29, 2001, the disclosures of which Applications are incorporated by reference herein.

BACKGROUND OF THE INVENTION

The present invention relates to a video signal transmitting apparatus, such as digital broadcast transmission equipment, VTRs and DVD players, and to a video signal receiving apparatus, such as television receivers or personal computer displays, VTRs and digital broadcast receiving terminals.

For broadcast of high quality image content by taking advantage of the widespread use of the digital broadcast service since 1998, there is a recognition that measures need to be taken to ensure that the broadcast content cannot be copied easily. To meet this requirement, a system has been proposed in which the content to be broadcast is encrypted by an apparatus on the transmitting side and the broadcast content is decrypted by an apparatus on the receiving side. In this system, when a receiving apparatus used has no key information for decryption, the decryption processing cannot be performed and thus the content not displayed. The system can also prevent the broadcast content from being copied, as it otherwise can be through connecting a VTR to an apparatus on the transmitting side. There is a growing consensus that, from the standpoint of copyright protection of the content, some increase in cost may be tolerated.

SUMMARY OF THE INVENTION

In a system that uses a personal computer as an apparatus on the transmitting side and an analog display as an apparatus on the receiving side, digital R, G, B output signals of a graphic chip in the personal computer are read at a generation timing of a clock synchronization signal and then entered into three digital-analog converters (DACs) and output along with the synchronization signal to an output connector. The analog R, G, B signals entered from an input connector of the display are adjusted in contrast and black level by a preamplifier before being displayed on the analog display device. The synchronization signal is used to synchronize the display device.

In an example case that uses this interface in driving a digital display such as a liquid crystal display, analog R, G, B signals entered from the input connector are sampled by analog-digital converters (ADCs) at a timing of a clock generated from the synchronization signal by a clock regenerator and are displayed on the display device by driving it. In this system, because the output clock of the clock regenerator does not precisely match the clock of the original clock generator, a display quality of the video is not satisfactory. To solve this problem, a device for automating a clock phase adjustment is used.

As a fundamental solution to this problem a digital interface has been proposed and used. In the transmitting apparatus, the digital R, G, B signals are supplied to a data converter along with the clock and synchronization signals. The data converter converts these signals into a form of digital signals that is not easily influenced by the transmission path between the input and output connectors. The converted signals are sent to the output connector. A DCI (Display Control Information) block has a function of transmitting, as a control signal, display control information used to perform the same power saving controls on a display (e.g., control of such functions as video mute and sleep mode so called "DPMS" (Display Power Management System)) that have been conducted in a conventional analog interface by detecting the presence or absence of a synchronization signal. In a digital display, a digital data signal is supplied to the data converter which in turn produces R, G, B signals of digital base band and synchronization signals. The video signals are displayed on the display device by driving it. At the same time, a DCI signal supplied from the connector is also entered into the display device. In this system, the digital R, G, B signals are entered into the display device without their quality being degraded, so that a high quality displaying of video signals can be realized. An example data conversion scheme is a TMDS (Transition Minimized Differential Signaling) which is a serial transmission method.

In a case where a digital interface is used and a connected apparatus on the receiving side is an analog display, the output signal of the data converter is entered into the DAC where it is converted into an analog signal before being supplied to the preamplifier and the display device. Hence, the apparatus on the receiving side requires the data converter and DAC, increasing the cost, which offsets the advantages of the analog display and thus hinders a widespread use of the digital interface.

It is true that the conventional method can provide the intended function of "preventing the copying of content." But the mainstream receiving apparatus is still an analog display of CRT type, such as television receivers. This raises the following problems.

Problem (1): The preferred video signals to be transmitted are luminance and color difference signals such as Y, Pb and Pr rather than R, G, B primary color signals. To meet this requirement it is preferred that the conversion from the primary signals into the luminance/color difference signals be performed on the transmitting side and information defining the conversion be sent out so that, when the luminance/color difference signal processing is performed on the receiving side, the conversion defining information can be used. However, no provision is made for transmitting the conversion defining information.

Problem (2): Similarly, no means is provided for transmitting an aspect ratio of video signals of the broadcast content.

Problem (3): The use of a DCI control line to realize the means for solving the above problems (1) and (2) increases cost. It is therefore necessary to enable even displays without the DCI control line to display the video normally.

Problem (4): When a receiving apparatus (display) with no decryption key information is blacked out, the user may misunderstand that the apparatus has failed. It is therefore necessary to display some image even when the display does not have the decryption key information, thereby preventing the user from mistaking the failure to display the video correctly for a display failure.

For each of the problems (1) to (4) described above, the present invention provides the following solutions.

The problem (1) is solved by providing the transmitting apparatus with a unit which transmits colorimetry information, used for determining the coefficient of the addition processing of the matrix circuit in the display, along with composite video information (information including a digital video signal of luminance/color difference type, and a clock signal and horizontal/vertical synchronization signals in synchronism with the luminance/color difference type digital video signal). On the receiving side, the addition processing coefficient in the matrix circuit is determined based on the colorimetry information.

As for the problem (2), an aspect ratio information transmission means for transmitting information on the aspect ratio of the digital video signal included in the composite video information is provided in the transmitting apparatus. On the receiving side, the predetermined aspect ratio conversion processing is performed on the received video signals according to the aspect ratio information received.

As for the problem (3), a synchronization frequency detecting means for determining a frequency from the horizontal and vertical synchronization signals included in the composite video information is provided in the display. According to the detecting result produced by the synchronization frequency detecting means, a default value of at least one of the two data, the colorimetry value for determining the addition processing coefficient in the matrix circuit and the video aspect ratio, is set.

As to the problem (4), the transmitting apparatus is enabled to communicate bi-directionally with the display and to receive from the display at least first display information indicating the presence or absence of decryption key information used to perform decryption processing on the encrypted composite video information. Further, the transmitting apparatus is provided with a decision means to decide, based on the first display information received from the display, whether or not the display has the decryption key information. When the decision means decides that the display does not have the decryption key information, the clock signal and the horizontal and vertical synchronization signals are set to predetermined frequencies and the composite video information is transmitted without being subjected to the decryption processing. As a result, when the decryption key information is not authenticated, a low-resolution video signal can be displayed to prevent the user from mistaking a blackout for a receiver failure.

Other objects, features and advantages of the invention will become apparent from the following description of the embodiments of the invention taken in conjunction with the accompanying drawings.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENTS

While we will show and describe several embodiments in accordance with our invention, it should be understood that disclosed embodiments are susceptible of changes and modifications without departing from the scope of the invention. Therefore, we do not intend to be bound by the details shown and described herein but intend to cover all such changes and modifications as fall within the scope of the appended claims.

Figure 1:
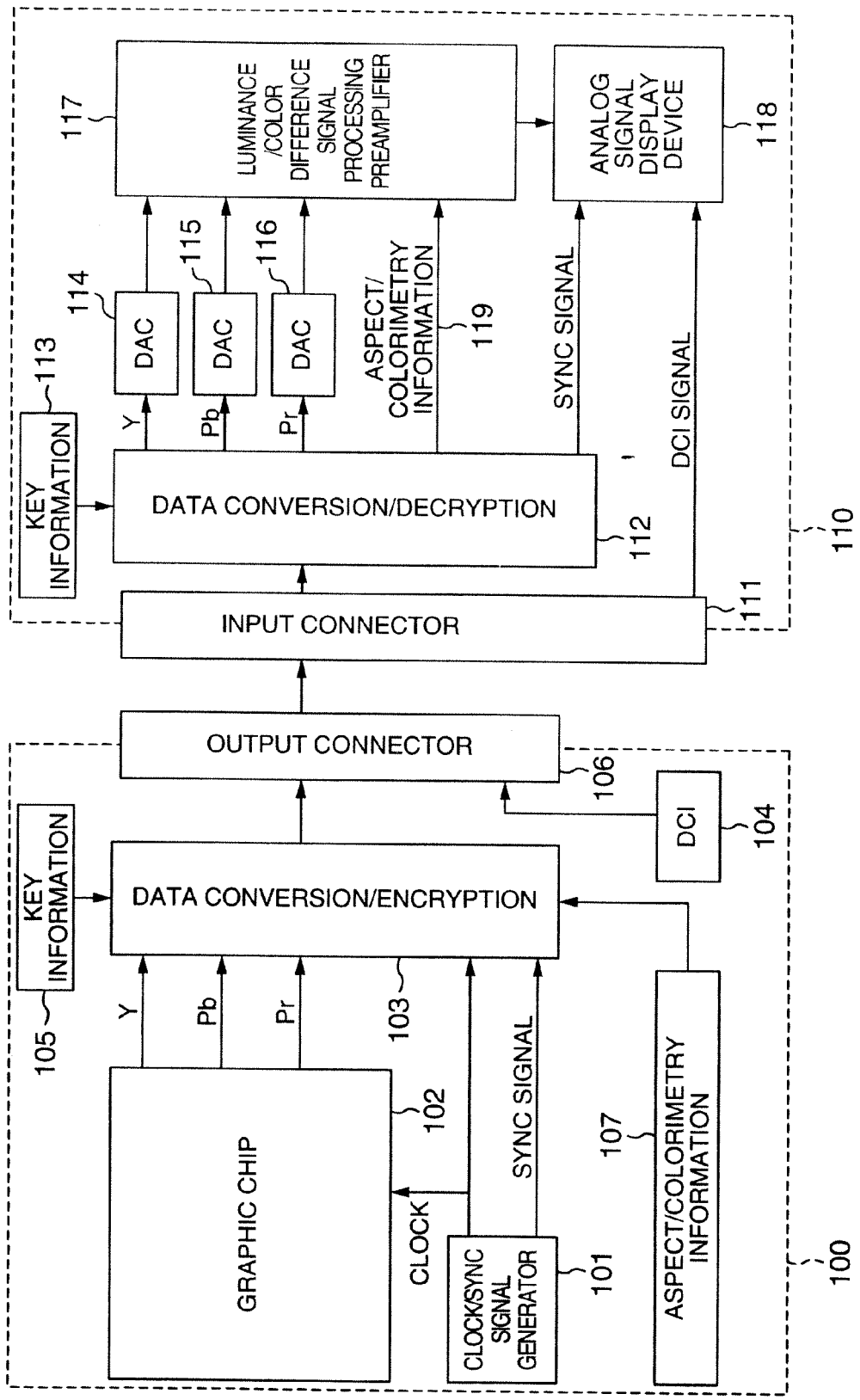
FIG. 1 is a configuration block diagram of a first embodiment of the present invention.

Now, the embodiments of the present invention will be described by referring to the accompanying drawings. FIG. 1 is an essential-part block diagram of a video transmitting apparatus and a video receiving apparatus according to a first embodiment of the invention. In FIG. 1, a video transmitting apparatus 100 comprises a clock/synchronization signal generator 101, a graphic chip 102, a data conversion and encryption processing block 103, a DCI signal processing block 104, an encryption key information block 105, an output connector 106, and an aspect ratio information and colorimetry information transmission block 107. A video receiving apparatus 110 comprises an input connector 111, a data conversion and decryption block 112, a decryption key information block 113, DACs 114-116, a luminance/color difference signal processing preamplifier 117, and an analog signal display device 118. In the video transmitting apparatus 100, the digital luminance/color difference signals Y, Pb, Pr are read out from the graphic chip 102 according to the timing of the clock/synchronization signal generator 101 and input to the data conversion and encryption processing block 103. Here, the data conversion and encryption processing block 103 performs data conversion processing and also encryption processing by using the encryption key information of the encryption key information block 105, and the processed data is transmitted as composite video information by the output connector 106. At the same time, aspect ratio information and colorimetry information on the video signal of the graphic chip 102 are also superimposed on the luminance/color difference signals and the synchronization signal, and then subjected to the data conversion processing before being transmitted by the output connector 106. A DCI signal is directly sent out from the block 104 through the output connector 106.

In the video receiving apparatus 110, the block 112 performs decryption processing and data conversion processing on the received data by using the decryption key information from the decryption key information block 113 and outputs the luminance/color difference signals to the DACs 114-116 and the synchronization signal to the display device 118. Here, if a receiving apparatus that has no key information for decryption is connected, the decryption processing cannot be performed and thus the video information cannot be displayed. The output signals of the DACs 114-116 are input to the preamplifier 117 which performs contrast processing, black level correction processing and image quality correction processing on the luminance signal and also hue and color saturation adjustments on the color difference signal. After having been subjected to these processing, the luminance and color difference signals are summed up by a matrix circuit (not shown) in the preamplifier 117. At this time, the addition coefficient is determined by the colorimetry information which is input through a signal line 119 separately from the luminance/color difference signals and the synchronization signal. The signals, after having undergone the matrix processing, are input to the display device 118 that displays the video signal. When the video signal is found to be, for example, a wide video (16:9) by detecting the display aspect information that is output from the block 112 through the signal line 119, and if the display device 118 has an aspect ratio of 4:3, then the block 117 performs signal processing such as vertically compressing the video. Conversely, when the aspect information represents a standard video (4:3) and if the display device 118 has an aspect ratio of 16:9, the block 117 performs signal processing such as horizontally compressing the video. The aspect ratio adjustment may also be done by deflection processing rather than performing the vertical or horizontal compression by the block 117.

As described above, the present invention can realize the transmitting apparatus and the receiving apparatus which comprise a transmission system capable of protecting the broadcast content by encryption and decryption functions using key information and a digital interface having an excellent compatibility with a television circuit realized by the transmission of luminance/color difference signals and signal aspect information.

Figure 2:
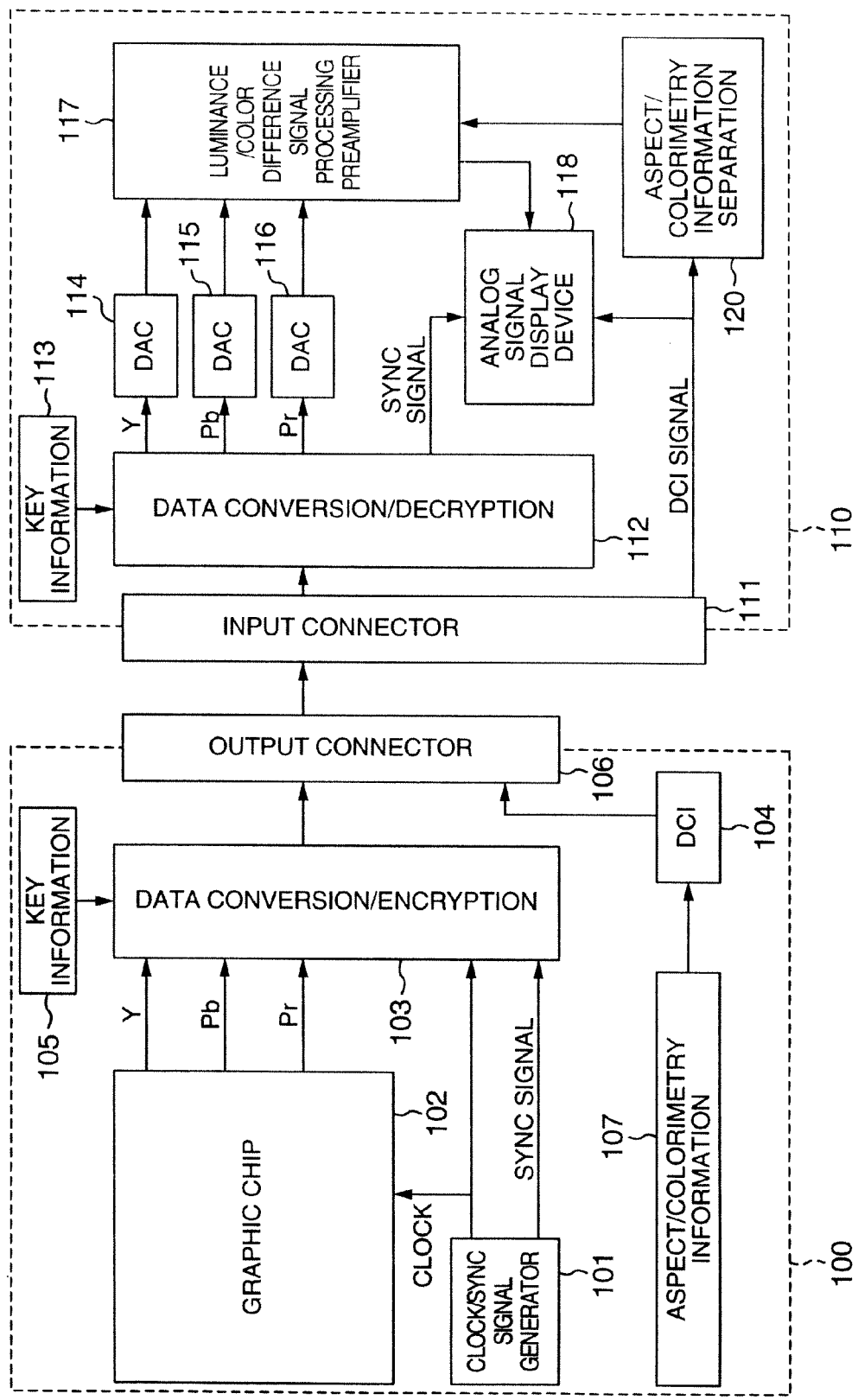
FIG. 2 is a configuration block diagram of a second embodiment of the present invention.

FIG. 2 shows a second embodiment of the invention, in which function blocks identical with those of the first embodiment are assigned like reference numerals. While in the first embodiment the signals from the aspect/colorimetry information transmission block 107 are entered into the data conversion/encryption processing block 103, this embodiment superimposes them over the DCI signal in the DCI signal processing block 104. The signal from the DCI block 104 is transmitted through the input/output connectors 106, 111 to the display device 118 of the receiving apparatus 110. It is also input to an aspect/colorimetry information separation block 120. According to the output signal from the block 120, the preamplifier 117 controls the matrix processing of the matrix circuit and the aspect conversion processing and produces the similar effects to those of the first embodiment.

Figure 3:
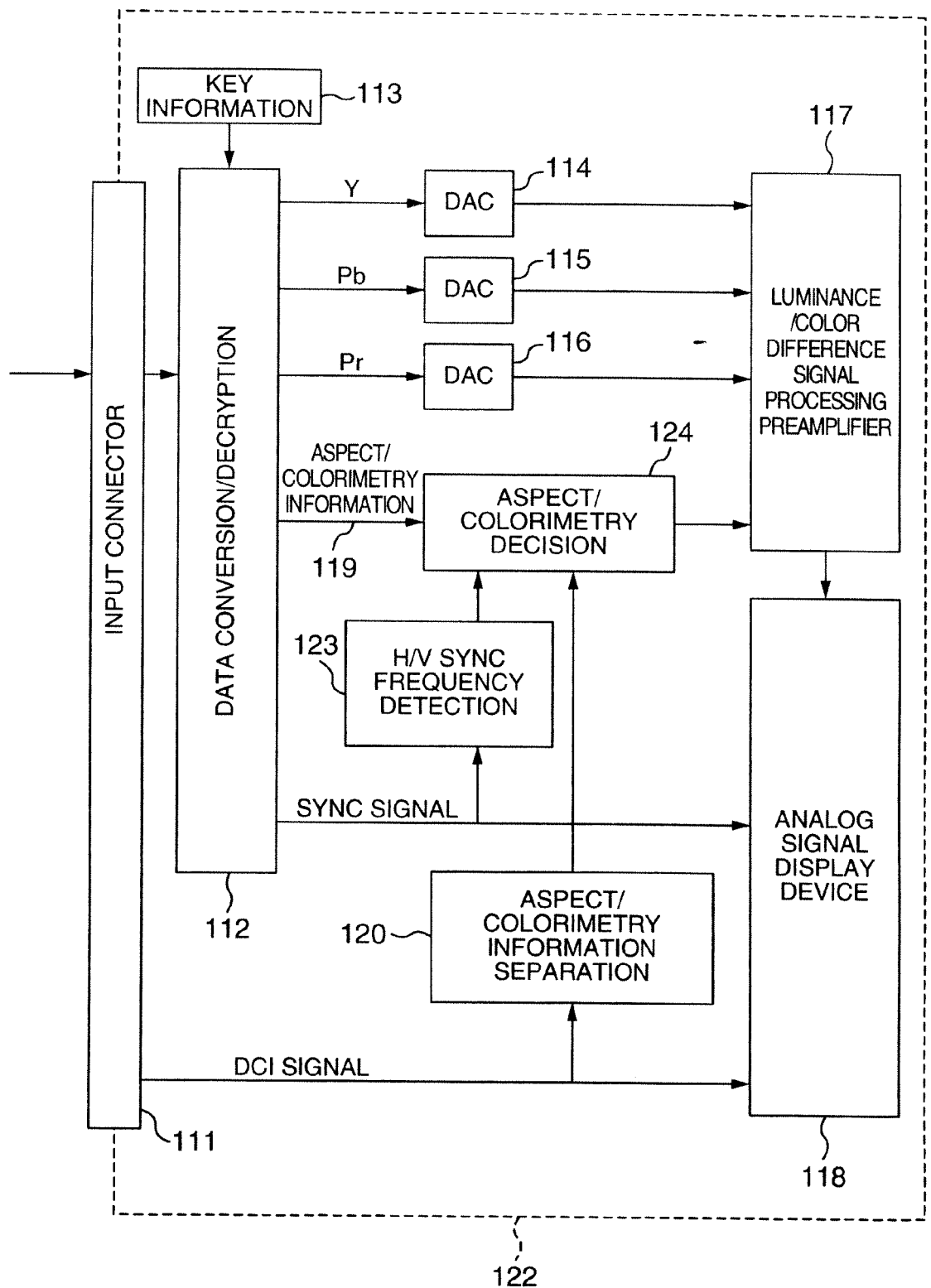
FIG. 3 is a configuration block diagram of a third embodiment of the present invention.

FIG. 3 shows a third embodiment of the invention, in which function blocks identical with those of the first and second embodiments are assigned like reference numerals. In the first and second embodiments, the signals of the aspect/colorimetry information block 107 are entered into the data conversion/encryption processing block 103 or into the DCI processing block 104. The third embodiment can handle both of the signal transmissions and, when there is neither of the signal transmissions, allows the receiving apparatus to deal with the situation.

A receiving apparatus 122 has added to the configuration of the first embodiment an aspect/colorimetry information separation block 120, a H/V synchronization frequency detection block 123, and an aspect/colorimetry decision block 124. The operation and function of the block 120 are as described in the second embodiment, and the information obtained from the signal line 119 is also as described in the first embodiment. The function of the block 123 is to detect the frequency of the synchronization signal and to output detection results, for example, in the following five conditions.

(1) When fH=15.75 kHz and fV=60 (or 59.94) Hz, video aspect=4:3 and colorimetry=SMPTE170M.

(2) When fH=31.5 kHz and fV=60 (or 59.94) Hz, video aspect=4:3 and colorimetry=SMPTE293M.

(3) When fH=33.75 kHz and fV=60 (or 59.94) Hz, video aspect=16:9 and colorimetry=SMPTE240M.

(4) When fH=45 kHz and fV=60 (or 59.94) Hz, video aspect=16:9 and colorimetry=SMPTE296M.

(5) In cases other than the above, video aspect=16:9 and colorimetry=SMPTE240M. (fH and fV are horizontal and vertical synchronization frequencies, and SMPTE is the name of the standardization committee on video signal in the U.S.A.)

When the block 124 cannot obtain the information from the block 120 or from the signal line 119, it selects one of (1) to (5) according to the synchronization signal frequency detection result from the block 123, determines the aspect and colorimetry and thereby controls the preamplifier 117. In this embodiment, even when none of the colorimetry information and the aspect information is transmitted, the effects similar to those of the first embodiment can be obtained.

Figure 4:
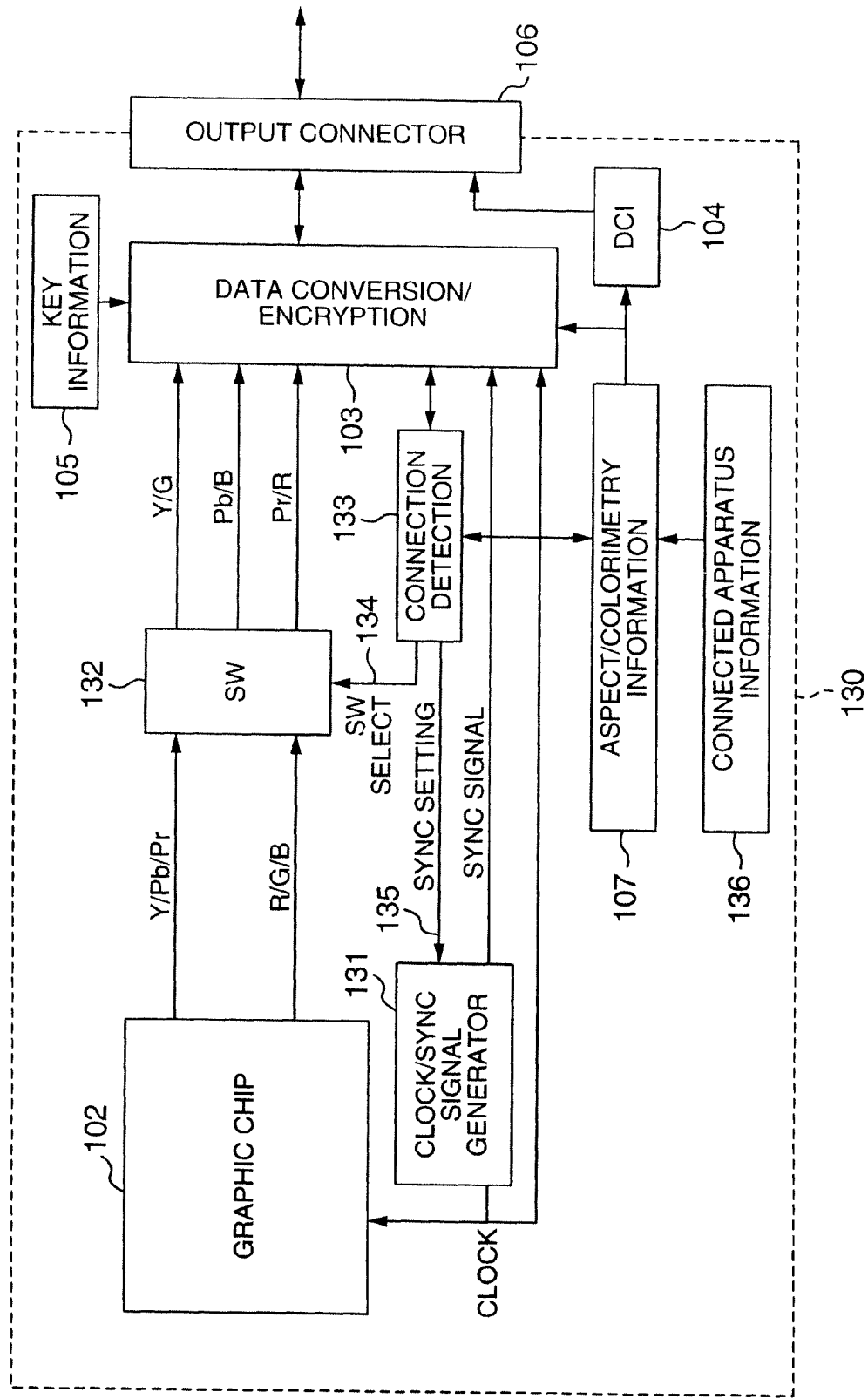
FIG. 4 is a configuration block diagram of a fourth embodiment of the present invention.

FIG. 4 shows a fourth embodiment of the invention, in which function blocks identical with those of the first and second embodiments are assigned like reference numerals. In the first and second embodiment, the aspect and colorimetry information is supplied to either the block 103 or the DCI processing block 104. In this embodiment, it is superimposed on both blocks. This embodiment adds to the transmitting apparatus 130 a connection detection block 133, a synchronization setting signal line 135, a SW select control line 134, a SW 132, and a connected apparatus information block 136. This embodiment can realize two functions, (a) preventing a blackout of the receiving apparatus and (b) preventing the condition of the connected apparatus from being misinterpreted.

The function (a) will be explained in the following. The output signal of the block 107 is entered to the blocks 104, 103. If the receiving apparatus matches the signal information from the DCI line or the signal information from the data conversion output, the aspect and colorimetry control can be made. In this embodiment, the signal line connecting the receiving apparatus and the transmitting apparatus is bi-directional and the transmitting apparatus has a function of authenticating the key information in the receiving apparatus. When the key authentication is not performed or failed, the connection detection block 133 performs control through the signal line 135 to change the synchronization setting of the block 131 to "fH=15.75 kHz, fV=60 Hz and interlace ratio of 1:2" or "fH=31.5 kHz and fV=60 Hz." As a result, the output signal Y, Pb, Pr of the graphic chip 102 is set to the so-called "NTSC grade" or "VGA grade" and, based on this signal, the block 103 performs only the data conversion (not decryption), allowing the receiving apparatus to display the video received through the connector 106 at a low resolution. That is, when the key authentication is performed, the video signal can be displayed at a high resolution; and when the key authentication is not performed, the video signal is displayed at a low resolution. In this way, a blackout can be prevented.

Next, the function (b) will be explained. The connected apparatus information block 136 stores information with which to check whether the receiving apparatus is capable of handling the luminance/color difference signal input such as Y, Pb and Pr. This information is input together with the information from the block 107 to the blocks 104, 103 and is superimposed on both of the signal information from the DCI line and the signal information from the data conversion output. In this embodiment, since the signal line connecting the receiving apparatus with the transmitting apparatus is bi-directional and the DCI signal line is also bi-directional, information indicating that "the receiving apparatus is capable of handling the luminance/color difference signal input" can be returned to the transmitting apparatus. For example, it is preferred that a command be defined in a command expansion area of the DCI2AB and standardized. When a command indicating "capable of handling the luminance/color difference signal input" is returned, the video signal continues to be transmitted. When a command indicating "not capable of handling the luminance/color difference signal input" is returned, the connection detection block 133 performs control to switch the signal input of the SW 132 from Y/Pb/Pr to R/G/B. As a result, the block 103 performs data conversion on the R, G, B primary color signal as the video signal and encrypts it before transmitting it to the connector 106. At the same time, the block 107 also outputs the colorimetry information representing the "primary color signal." Therefore, if the receiving apparatus is a personal computer display which accepts only the RGB input, it is possible, as long as the connector 106 of the same standard is used, to prevent the video signal from being displayed in wrong colors, thus allowing a variety of connecting configurations to be used. This system thus can reproduce a video with high quality and high resolution while at the same time realizing the copyright protection which allows only the users authorized by the key information to retrieve that content. This system can also provide a transmitting apparatus, a display and an interface harmonized with a television-based rationalized circuit.

The display taken as an example of the receiving apparatus with an input connector in this embodiment includes a television, a front data projector and a personal computer monitor and also a recording device such as VTR. In other words, this function can be realized with any apparatus capable of receiving a digitized video signal (including digital broadcast signal) and can be implemented in any form not limited to this embodiment.

What is claimed is:

1. A video signal transmitting/receiving system in which a video signal transmitting apparatus transmits video signals and a video signal receiving apparatus receives the video signals, the video signal transmitting apparatus comprising:
a video signal output block capable of transmitting either a first type of video signals including luminance signals and color difference signals or a second type of video signals including three primary color signals to the video signal receiving apparatus; and
an information acquisition block for acquiring, from the video signal receiving apparatus, information indicating whether or not the video signal receiving apparatus is capable of handling the first type video signals, wherein:
the video signal output block transmits colorimetry information on the first type video signals in addition to the first type video signals to the video signal receiving apparatus if the information acquired by the information acquisition block indicates that the video signal receiving apparatus is capable of handling the first type video signals; and
the video signal output block transmits colorimetry information on the second type video signals in addition to the second type video signals to the video signal receiving apparatus if the information acquired by the information acquisition block indicates that the video signal receiving apparatus is not capable of handling the first type video signals, and the video signal receiving apparatus comprising:
a receiving block capable of receiving, from the video signal transmitting apparatus, a video signal and colorimetry information multiplexed on the video signal;
a processing block for processing the received video signal using colorimetry information; and
a decision block for deciding colorimetry information according to a signal format of a received video signal, wherein:
the decision block judges whether the receiving block receives colorimetry information, and when the receiving block does not receive colorimetry information, the processing block processes the received video signal using the colorimetry information decided by the decision block; and
the video signal receiving apparatus returns information indicating whether the video signal receiving apparatus is capable of handling the luminance/color difference signal input.

2. A video signal transmitting/receiving system in which a video signal transmitting apparatus transmits video signals and a video signal receiving apparatus receives the video signals, the video signal transmitting apparatus comprising:
a video signal output block capable of transmitting either a first type of video signals including luminance signals and color difference signals or a second type of video signals including three primary color signals to the video signal receiving apparatus; and
an information acquisition block for acquiring, from the video signal receiving apparatus, information indicating whether or not the video signal receiving apparatus is capable of handling the first type video signals, wherein:
the video signal output block transmits colorimetry information on the first type video signals in addition to the first type video signals to the video signal receiving apparatus if the information acquired by the information acquisition block indicates that the video signal receiving apparatus is capable of handling the first type video signals; and
the video signal output block transmits colorimetry information on the second type video signals in addition to the second type video signals to the video signal receiving apparatus if the information acquired by the information acquisition block indicates that the video signal receiving apparatus is not capable of handling the first type video signals, and the video signal receiving apparatus comprising:
a receiving block capable of receiving, from the video signal transmitting apparatus, a video signal and colorimetry information added to the video signal;
a processing block for processing the received video signal using colorimetry information; and
a decision block for deciding colorimetry information according to a signal format of a received video signal, wherein:
the decision block judges whether the receiving block receives colorimetry information, and when the receiving block receives colorimetry information, the processing block processes the received video signal using the received colorimetry information;
when the receiving block does not receive colorimetry information, the processing block processes the received video signal using the colorimetry information decided by the decision block; and
the video signal receiving apparatus returns information indicating whether the video signal receiving apparatus is capable of handling the luminance/color difference signal input.

3. The video signal receiving apparatus according to claim 1, wherein:
the receiving block receives information concerning an aspect ratio of a received video signal;
the processing block processes a signal using the received aspect ratio information; and
when the receiving block does not receive aspect ratio information, the processing block processes a signal using aspect ratio information decided according to a signal format of a received video signal.

* * * * *